Patented Sept. 18, 1934

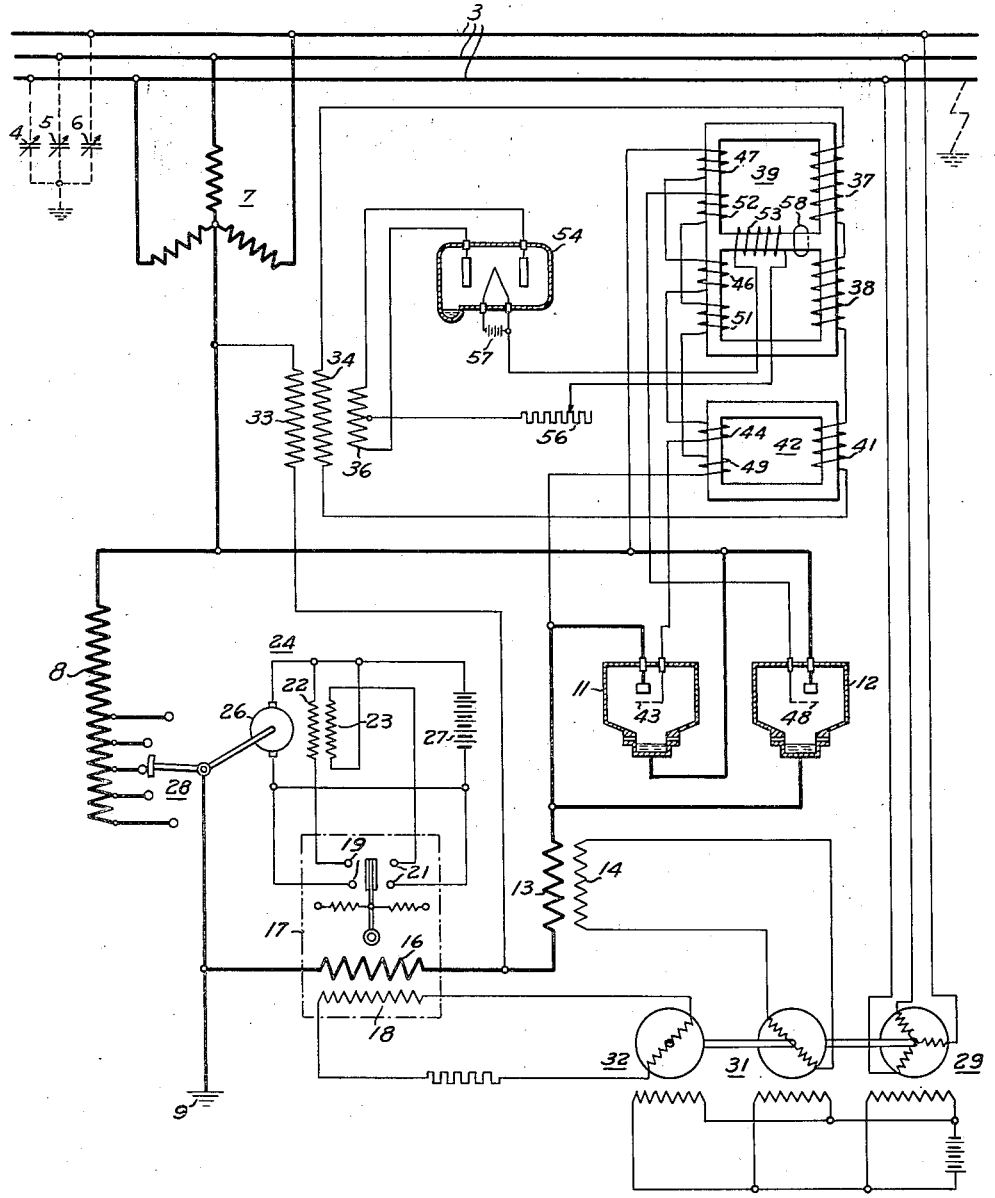

1,974,139

UNITED STATES PATENT OFFICE 1,974,139

PROTECTIVE SYSTEM

Julius Jonas, Baden, Switzerland, assignor to Aktiengesellschaft Brown Boveri & Cie., Baden, Switzerland, a joint-stock company of Switzerland Application January 23, 1933, Serial No. 653,080
In Germany February 9, 1932

14 Claims. (Cl. 172—237)

This invention relates to improvements in protective systems for electric transmission lines or networks and more particularly to means for protecting such lines from the effects of accidental contact between a conductor thereof and ground.

It is well known to connect the neutral point of some apparatus energized from a line with ground through impedance means having particular electrical characteristics for the purpose of suppressing the fault or ground current which would flow upon accidental conductive connection between one of the conductors of the line and ground. Such means usually consist of a reactor tuned to resonance with the capacity of the line to ground at a frequency which may be the operating frequency of the line or which may differ from such frequency. It is then necessary to provide means for maintaining such resonance condition when portions of the line are connected or disconnected in response to service requirements thereby causing a change in the capacity of the connected energized portions of the line. The reactor may then be provided with taps and automatic means responsive to the electrical conditions of the line may be provided for changing the taps of the reactor.

During normal operation, it is generally found that the capacities to ground of the several conductors have values differing from each other with the result that the capacity currents flowing between line and ground do not cancel each other in the grounded neutral connection and therefore cause the flow of a residual current within the grounding reactor. The neutral point potential of the line is thus shifted from ground potential by an amount equal to the voltage drop within the grounding reactor and the line does not operate under the desired voltage conditions. The above disadvantage may be avoided by shunting the reactor, during normal operation, over a circuit which may be a direct short circuit or which preferably includes the measuring circuit utilized for the automatic adjustment of the reactor. Such shunting may be obtained by any circuit closing and interrupting means and is preferably obtained by means of electron discharge devices which are made inoperative upon occurrence of a ground fault on the line. With a system of such character the measuring circuit of the reactor tuning system does not carry the ground current circulating upon occurrence of a fault.

It is accordingly one of the objects of the present invention to provide an electric line protective system comprising impedance means which may be short circuited during normal operation of the line.

Another object of the present invention is to provide an electric line protective system comprising impedance means which may be short circuited by means of electron discharge devices.

Another object of the present invention is to provide an electric line protective system comprising impedance means which may be shunted by a measuring circuit associated with impedance adjusting means.

Another object of the present invention is to provide an electric line protective system comprising impedance means which may be automatically maintained inoperative during normal operation of the line.

Another object of the present invention is to provide an electric line protective system comprising impedance means which may be automatically made operative upon occurrence of a ground fault on the line.

Another object of the present invention is to provide an electric line protective system comprising impedance means which may be automatically adjusted to the proper operating value.

Another object of the present invention is to provide an electric line protective system comprising impedance means which may be adjusted to their operating value by means responsive to currents at an arbitrarily chosen frequency.

Another object of the present invention is to provide an electric circuit which may be opened or closed by an electron discharge device in response to the variable energization of the control electrodes of such device.

Another object is to provide an electron discharge device which may be regulated in response to the amount of current flowing therethrough.

Another object is to provide an electron discharge device which may be regulated in response to the magnitude of the arc drop within such device.

Objects and advantages other than those above set forth will be apparent from the following description when read in connection with the accompanying drawing which diagrammatically illustrates one embodiment of the present invention in which a grounding reactor is automatically tuned with the line capacity at the frequency of an auxiliary source of alternating currents and in which such reactor is bridged by a measuring circuit through electron discharge devices of the vapor type during normal operation of the line.

Referring more particularly to the drawing by characters of reference, the reference numeral 3 designates an alternating current transmission line herein illustrated as a three-phase line because such type of line is most frequently utilized in practice. It will be understood that line 3 comprises a plurality of sections which may be connected or disconnected thereby causing the capacity of the line portion to be protected to be variable. For the purpose of more clearly illustrating the operation of the system, the capacities of the conductors of line 3 to ground are herein represented by three fictitious variable condensers 4, 5, 6. Line 3 is grounded at the neutral point of a group of windings 7, which may be the windings of a generator or one set of the windings of a transformer, through impedance means herein assumed to consist of a grounding reactor 8 provided with a plurality of taps permitting adjustment of the value of the operating reactance of such reactor. Reactor 8 is connected with ground as at 9 and is shunted by two electron discharge devices 11 and 12 oppositely connected in parallel to permit flow of alternate half cycles of alternating current through secondary winding 13 of a transformer having a primary winding 14, and through the current coil 16 of a relay 17. Relay 17 is in the nature of a wattmeter and is therefore provided with a voltage coil 18, and is operable to close a set of contacts 19 or another set of contacts 21 depending upon the phase relation of the currents flowing in coils 16 and 18. Contacts 19 and 21 control the energization of field windings 22 and 23 of a motor 24 having an armature 26 energized from a source 27 in such a manner that closure of contacts 19 causes armature 26 to rotate in one direction and closure of contacts 21 causes such armature to rotate in the other direction. Motor 24 operates a tap changer 28 which may be of any type known in the art to change the point of connection of reactor 8 with ground 9 and thereby to change the operating reactance of reactor 8. A synchronous motor 29 energized from line 3 drives a synchronous generator 31 energizing winding 14 and a second synchronous generator 32 supplying current to coil 18. The numbers of poles of motor 29 and of generators 31 and 32 are so chosen that generators 31 and 32 deliver currents at the same frequency which may be the operating frequency of line 3 but which preferably differs therefrom by a small amount, such frequency being maintained in invariable relation with the frequency of line 3 by the mechanical connection of motor 29 with generators 31 and 32. The voltage of generator 32 preferably lags behind the voltage of generator 31 by an angle of 90 electrical degrees for a purpose which will appear hereinafter.

Reactor 8 and coil 16 are bridged by the primary winding 33 of a control transformer having a secondary winding 34 and a tertiary winding 36. Winding 34 energizes two primary winding portions 37 and 38 of a transformer 39 and also the primary winding 41 of a transformer 42, such primary windings all being in series connection. Device 11 is provided with a control electrode 43 operable to permit the flow of current therethrough when such control electrode is positively energized with respect to the cathode potential of the device and to prevent the initiation of such flow when such control electrode is at a negative potential with respect to the cathode. Electrode 43 is connected with the cathode of device 11 through secondary winding 44 of transformer 42 and secondary winding portions 46 and 47 of transformer 39. The connections of transformers 39 and 42 are such that the voltage of winding portions 46 and 47 is greater than the voltage of winding 44 and opposed thereto and that the resultant voltage impressed between control electrode 43 and the cathode of device 11 is in phase with the voltage impressed between the anode and such cathode, thereby permitting the flow of current therethrough. Device 12 is also provided with a control electrode 48 energized by means of winding portions 52 and 51 and by winding 49 to permit flow of current through device 12. Transformer 39 is provided with a saturating winding 53 which may receive substantially uniform direct current from a suitable rectifying device 54 energized by winding 36, the amount of such direct current being adjustable by means of a rheostat 56. The magnetic flux within the core of winding 53 may be maintained at a uniform value independently of the ripple variation of the current in coil 53 by means of a short circuited winding 58 surrounding such core.

In operation, assuming that line 3 is not energized, rectifier 54 is maintained in operative condition by any of the usual means such as a battery 57 maintaining the filament of the rectifier at incandescence. Devices 11 and 12 may be similarly maintained operative by filament batteries (not shown) if such devices are of the hot cathode type, or such devices may have an arc ignited and maintained therein by the usual means (not shown) if such devices are of the liquid cathode type. Upon energization of line 3, capacity currents will flow between the conductors of such line and ground, causing the flow of a small residual current through reactor 8 due to the difference in the values of the capacities of the individual conductors to ground. The flow of such current through reactor 8 produces therein a voltage drop which is impressed on winding 33 and is transmitted by winding 34 to the primary windings of transformers 39 and 42. The control electrodes 43 and 48 are thereby maintained at voltages which are in phase with the respective anode voltages, with respect to the associated cathodes, thereby permitting devices 11 and 12 to short circuit reactor 8. The short circuit includes the impedance of windings 13 and 16 and also the arc drop within devices 11 and 12 which may be of the order of approximately 20 volts in magnitude so that the residual voltage impressed on reactor 8 due to the flow of current through devices 11 and 12 is very small in comparison with the phase voltages of line 3. The current flowing through winding 53 of transformer 39, which is dependent upon the voltage of winding 33, is thus limited to a comparatively small value and the magnetomotive force due to the flow of current in such winding does not appreciably affect the operation of transformer 39.

Due to the energization of line 3, motor 29 drives generators 31 and 32 and generator 31 energizes winding 14 to impress an alternating current voltage upon reactor 8 connected in parallel with condensers 4, 5 and 6 (representing the partial capacities of the line 3) through winding 7 and line 3. The current flowing through coil 16 will therefore be in phase with the voltage of winding 14 if reactor 8 is in resonance with the total of the capacities of condensers 4, 5 and 6 for the frequency of generator 31. Such current lags behind the voltage of winding 14 if the reactance of reactor 8 is too small and such current leads if the reactance of the reactor 8 is too large. Winding 18 receiving current which is 90 electrical degrees out of phase with respect to the voltage impressed on winding 14, relay 17 will not close either of the pairs of contacts, or will close contacts 19, contacts 21 according to which of the above defined conditions is present. Motor 24 will therefore operate tap changer 28 to adjust the reactance of reactor 8 to such value that the current in winding 16 is 90° out of phase with the current in winding 18, whereupon both contacts 19 and 21 remain open and motor 24 will stop. Such adjusting operation is initiated at each switching operation of line 31 changing the capacity thereof to ground so as to maintain constant resonance condition between the line and reactor 8 for the frequency of generator 31. If the frequency of line 3 fluctuates, the frequency of generator 31 will receive corresponding fluctuations so that reactor 8 and line 3 are always maintained tuned in resonance for a frequency which is in a definite relation with the operating frequency of the line.

Upon occurrence of a ground fault on one of the conductors of line 3 the phase voltage of such conductor is suddenly impressed on reactor 8, on winding 33 and on devices 11 and 12 thereby causing the flow of a large amount of current through such devices. As is well known in the electric current rectifying art, the sudden occurrence of a large overload in an electron discharge device which was previously carrying a comparatively small load introduces a considerable disturbance into the operation of such device. The reason for such disturbance is that not enough ionized vapor is generated at the time of application of the overload to neutralize the space charge due to the dense flow of electrons carrying the overload current with the result that the arc drop within the device temporarily increases to a value which may reach several times the normal value thereof. The arc drop of devices 11 and 12 is also impressed on winding 33 and an abnormally high voltage is induced in winding 36 inductively connected therewith. A large current thus flows through winding 53 thereby producing a large direct current magnetic flux within the core members of transformer 39. The core members of transformer 39 are thus saturated so that the entire voltage of the winding 34 appears across primary winding 41 of transformer 42 and control electrodes 43 and 48 are energized solely from windings 44 and 49, the control electrodes being thereby maintained at voltages 180° out of phase with the anode voltages of devices 11 and 12. Upon such energization of control electrodes 43 and 48, devices 11 and 12 become inoperative and therefore interrupt the circuit shunting the reactor 8. The full phase voltage of line 3 thus is maintained across reactor 8 which thus prevents the flow of any appreciable amount of current between the grounded conductor of line 3 and ground 9 as is well known in the art. Reactor 8 continues to be energized at the phase voltage of line 3 as long as the fault connection of line 3 is not removed, during which period the control electrodes of devices 11 and 12 continue to maintain such devices inoperative. Upon removal of the fault connection, normal operating conditions are restored and the system again operates as described above.

Although but one embodiment of the present invention has been illustrated and described, it will be apparent to those skilled in the art that various changes and modifications may be made therein without departing from the spirit of the invention or from the scope of the appended claims.

It is claimed and desired to secure by Letters Patent:

1. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, means substantially short circuiting said reactor during normal operation of said line, means for preventing operation of the first said means upon grounding of one of the conductors of said line, and means for operating said switch upon failure of resonance relation between said line and said reactor.

2. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, means connected with the control electrodes to prevent operation of said devices upon grounding of one of the conductors of said line, and means for operating said switch upon failure of resonance relation between said line and said reactor.

3. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices provided with control electrodes, said devices being connected oppositely in parallel and cojointly in parallel with said reactor to form substantially a short circuit for said reactor during normal operation of said line, means connected with the control electrodes to prevent operation of said devices upon grounding of one of the conductors of said line, and means for operating said switch upon failure of resonance relation between said line and said reactor.

4. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, means connected with the control electrodes to impress a potential thereon dependent on the potential between the neutral point of said windings and ground, rise of the impressed potential above a predetermined value preventing operation of said devices and decrease of the impressed potential below a predetermined value permitting operation of said devices, and means for operating said switch upon failure of resonance relation between said line and said reactor.

5. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, a plurality of transformers having primary windings connected in parallel with said reactor and each having a plurality of secondary windings connected with the control electrodes of said device to cause energization thereof upon normal operation of said line, and means for operating said switch upon failure of resonance relations between said line and said reactor.

6. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, a plurality of transformers having primary windings connected in parallel with said reactor and each having a plurality of secondary windings connected in opposition, the control electrodes being connected with the secondary windings of each of said transformers connected in opposition to impress a potential on the control electrodes in phase coincidence with the potential applied to said devices during normal operation of said line, and means for operating said switch upon failure of resonance relations between said line and said reactor.

7. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, a plurality of transformers having primary windings connected in parallel with said reactor and each having a plurality of secondary windings connected in opposition, the control electrodes being connected with the secondary windings of each of said transformers connected in opposition to impress a potential on the control electrodes in phase coincidence with the potential applied to said devices during normal operation of said line, means for neutralizing the effect of the secondary windings of one of said transformers to cause impression of a potential on the control electrodes in phase opposition to the potential applied to said devices during normal operation of said line, and means for operating said switch upon failure of resonance relations between said line and said reactor.

8. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, a plurality of transformers having primary windings connected in parallel with said reactor and each having a plurality of secondary windings connected in opposition, the control electrodes being connected with the secondary windings of each of said transformers connected in opposition to impress a potential on the control electrodes in phase coincidence with the potential applied to said devices during normal operation of said line, a winding on the core of one of said transformers to saturate the same upon grounding of one of the conductors of said line, means for applying a variable direct current to the last said winding dependent on the conditions of said line to neutralize the effect of one of said transformers upon abnormal operation of said line, and means for operating said switch upon failure of resonance relations between said line and said reactor.

9. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, a plurality of transformers having primary windings connected in parallel with said reactor and each having a plurality of secondary windings connected in opposition, the control electrodes being connected with the secondary windings of each of said transformers connected in opposition to impress a potential on the control electrodes in phase coincidence with the potential applied to said devices during normal operation of said line, a winding on the core of one of said transformers to saturate the same upon grounding of one of the conductors of said line, an electron discharge device having the positive electrodes thereof connected in parallel with said reactor and the negative electrode thereof connected with the last said winding to vary the operation of said transformer dependent on the current flowing from the neutral point of the first said windings to ground.

10. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, a transformer having the primary winding thereof connected in parallel with said reactor, a plurality of transformers having the primary windings connected in series with the secondary winding of the first said transformer and each having a plurality of secondary windings, the control electrodes being connected with the secondary windings of each of said transformers connected in opposition to impress a potential on the control electrodes of said devices in phase coincidence with the potential applied to said devices during normal operation of said line, a winding arranged on the core of one of the second said transformers to saturate the same upon grounding of one of the conductors of said line, means for applying a variable direct current to said winding dependent on the conditions of said line to neutralize the effect of said transformer upon abnormal operation of said line, and means for operating said switch upon failure of resonance relations between said line and said reactor.

11. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, a transformer having the primary winding thereof connected in parallel with said reactor and having a secondary and a tertiary winding, a plurality of transformers having the primary windings thereof connected in series with the secondary winding of the first said transformer and each having a plurality of secondary windings, the control electrodes being connected with the secondary windings of each of the second said transformers to impress a potential on the control electrodes in phase coincidence with the potential applied to said devices during normal operation of said line, a winding arranged on the core of one of the second said transformers to saturate the same upon grounding of one of the conductors of said line, an electron discharge device having the positive electrodes thereof connected with the tertiary winding of the first said transformer and the negative electrode thereof connected with the secondary winding of the first said transformer to vary the operation of one of the second said transformers dependent on the current flowing from the neutral point of the first said windings to ground, and means for operating said switch upon failure of resonance relations between said line and said reactor.

12. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, means substantially short circuiting said reactor during normal operation of said line, means for preventing operation of the first said means upon grounding of one of the conductors of said line, a motor operable in both directions of rotation for operating said switch, sources of alternating current of a predetermined frequency, one of said sources applying current to said line and to said reactor, and means responsive to the relation of current of one of said sources with the voltage of the other of said sources to control operation of said motor.

13. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, means substantially short circuiting said reactor during normal operation of said line, means for preventing operation of the first said means upon grounding of one of the conductors of said line, a motor operable in both directions for operating said switch, a plurality of alternating current generators, means for operating said generators at a predetermined frequency to supply current to said line and to said reactor, and a wattmetric relay responsive to the current of one of said generators and to the voltage of the other of said generators to control operation of said motor.

14. In a system for protecting electric transmission lines from the effects of grounds, an alternating current transmission line, windings connected with said line and with each other to provide a neutral point, a reactor connected with the neutral point of said windings, said reactor being formed with taps and tuned to resonance with said line for a predetermined frequency, a tap changing switch connecting said reactor to ground, electron discharge devices substantially short circuiting said reactor during normal operation of said line, said devices having control electrodes, a transformer having the primary winding thereof connected in parallel with said reactor and having a secondary and a tertiary winding, a plurality of transformers having the primary windings connected in series with the secondary winding of the first said transformer and each having a plurality of secondary windings, the control electrodes being connected with a secondary winding of each of the second said transformers to impress a potential on the control electrodes in phase coincidence with the potential applied to said devices during normal operation of said line, a winding arranged on the core of one of the second said transformers, an electron discharge device having the positive electrodes thereof connected with the tertiary winding of the first said transformer and the negative electrode connected with the secondary winding of the first said transformer to vary the operation of one of the second said transformers dependent on the current flowing from the neutral point of the first said windings to ground, a motor operable in either direction for operating said switch, a plurality of alternating current generators, means for operating said generators at a predetermined frequency, and a relay responsive to the current of one of said generators and the voltage of the other of said generators to control operation of said motor.

JULIUS JONAS.